(12) United States Patent
del Rio Romero et al.

(10) Patent No.: US 8,301,149 B2
(45) Date of Patent: Oct. 30, 2012

(54) CALL QUALITY AND COVERAGE IMPROVEMENT IN MOBILE WIRELESS COMMUNICATION NETWORKS

(75) Inventors: Juan Carlos del Rio Romero, Barcelona (ES); Juan Jose Guerrero Garcia, Malaga (ES); Juan Ramiro Moreno, Malaga (ES)

(73) Assignee: Optimi Corporation, Atlanta, GA (US)

( * ) Notice: Subject to any disclaimer, the term of this patent is extended or adjusted under 35 U.S.C. 154(b) by 555 days.

(21) Appl. No.: 12/369,936

(22) Filed: Feb. 12, 2009

(65) Prior Publication Data

US 2010/0203881 A1    Aug. 12, 2010

(51) Int. Cl.
*H04W 88/02* (2009.01)
(52) U.S. Cl. ......................... 455/443; 455/439
(58) Field of Classification Search .......... 455/446–449, 455/423, 443, 439
See application file for complete search history.

(56) References Cited

U.S. PATENT DOCUMENTS

| | | | | |
|---|---|---|---|---|
| 5,434,798 | A  * | 7/1995 | Madebrink et al. ........... | 709/221 |
| 2004/0054766 | A1 | 3/2004 | Vicente | |
| 2005/0130662 | A1* | 6/2005 | Murai ........................... | 455/444 |
| 2006/0128371 | A1* | 6/2006 | Dillon et al. .................. | 455/423 |

OTHER PUBLICATIONS

NGMN "NGMN Recommendation on SON & O&M Requirements" Third Generation Partnership Project (3GPP), Dec. 23, 2008 XP050335477, pp. 1-53 [online] [retrieved on Jan. 18, 2012] retrieved from: http://www.ngmn.org/uploads/media/NGMN_Recommendation_on_SON_and_O_M_Requirements.pdf.
Feng, S. "Self-Organizing Networks (SON) in 3GPP Long Term Evolution" May 20, 2008, pp. 1-15 [online] [retrieved on Jan. 18, 2012] retrieved from: http://www.nomor.de/uploads/gc/TQ/gcTQfDWApo9osPfQwQoBzw/SelfOrganisingNetworksInLTE_2008-05.pdf.
European Search Report Publication # EP 2 219 402 A3 dated Jan. 4, 2012 in European Patent Application No. EP 10 15 1050.

* cited by examiner

*Primary Examiner* — Diane Mizrahi
(74) *Attorney, Agent, or Firm* — Hope Baldauff Hartman, LLC (57) ABSTRACT

Technologies are described herein for improving call quality and coverage of cells within a mobile wireless communication network. Such improvements can be accomplished by adjusting various radio access network parameters. The adjustments may be made at the cell level or at the neighbor level. An iterative process can periodically collect key performance indicator (KPI) statistics from the mobile wireless network. System improvements may derive from one or more rules applied in parallel. Each rule can have a unique combination of minimum or maximum KPI thresholds. System issues may be identified when a cell correlates with one or more of the rules which may then suggest one or more parameter changes to reduce the identified system issue. System capacity policies may be provided as limits to the coverage and call quality triggers.

20 Claims, 6 Drawing Sheets

CALL QUALITY AND COVERAGE IMPROVEMENT IN MOBILE WIRELESS COMMUNICATION NETWORKS

BACKGROUND

Wireless communication networks, such as those supporting mobile telephone and data services, naturally have operational limitations. These limitations may be physical limitations, such as equipment limitations, frequency allocations, power limits, base station placement, antenna configurations, noise, environmental factors, and so forth. Limitations may also be introduced by suboptimal system configurations. Two particular manifestations of wireless system limitations are call quality and coverage. Generally, poor call quality can be characterized by dropped calls, excessive power clipping, or a combination of both. Coverage problems may generally relate to failures to fully cover a service area such as low signal levels within a particular area.

Traditionally, coverage problems may be mitigated by adding more base station sites to provide additional coverage. Unfortunately, such approaches can have considerable lead-time delays as well as considerable costs in both capital expenditure and operating expenses. Furthermore, adding physical resources is generally a locally isolated solution with little flexibility for mitigating operational limitations across the network.

Traditionally, call quality problems may be approached by adjusting some radio resource parameters at the network or cluster level. Generally, these adjustments do not involve optimization at a cell or neighbor granularity due to computational complexity and a high volume of data to analyze.

It is with respect to these considerations and others that the disclosure made herein is presented.

SUMMARY

Technologies are described herein for improving call quality and coverage of cells within a mobile wireless communication network. Such improvements can be accomplished by adjusting various radio access network (RAN) parameters, thus transforming an initial RAN configuration into a second RAN configuration. The adjustments may be made at the cell level or at the neighboring cell level. The adjustments can be applied iteratively in response to various collected operational statistics. The adjustments can adapt cell size and cell shape as well as adapt handover to maximize system resource and hardware utilization. An iterative process of optimization can periodically collect performance statistics and network configuration information from a mobile wireless network. The collected information can be periodically analyzed to determine parameter adjustments. The technology presented herein for improving call quality and coverage within the communication network can prevent or delay acquisition of additional hardware resources to address coverage concerns. Also, call quality may be practically addressed without confronting computationally intractable optimizations.

According to one aspect of the technology discussed herein, improved call quality may reduce dropped calls, excessive power clipping, or both. Similarly, improved coverage may reduce failures to fully cover service areas and improve low signal levels within particular service areas.

According to another aspect of the technology discussed herein, coverage and call quality issues may be coded as rules. System improvements may derive from one or more rules applied in parallel. A rule may take, as input, a combination of several acceptable key performance indicator (KPI) ranges and provide, as output, parameters to be adjusted or optimized. An acceptable range may be defined as the maximum and minimum limits within which fluctuations may be tolerated. Each KPI can have its own acceptable range. These ranges may be common to multiple cells within the optimization area. Each rule can support detection of a certain coverage or quality issue by identifying one or more out-of-range KPIs. System issues can be identified when a cell correlates with one or more of the rules by approaching or exceeding the acceptable range limits associated with the group of KPIs specified in the respective rule. The rule may then suggest one or more parameter changes to reduce the identified system issue.

According to yet another aspect of the technology discussed herein, cell size and cell shape can be adjusted. The bounds between a cell and a neighboring cell can be adjusted to improve the coverage and interference while reducing or delaying the addition of more cell sites in the network. Call quality on those cells may be addressed by providing additional resources per user according to demand. The cell size and shape adjustments can be made by adjusting handover parameters, power levels, antenna tilt, and various other system characteristics.

According to yet another aspect of the technology discussed herein, capacity rules may also be applied. Capacity rules may mitigate capacity issues arising from parameter adjustments made with respect to coverage and call quality alone. As such, the capacity rules may be considered limits for the coverage and call quality triggers.

According to yet another aspect of the technology discussed herein, an iterative process of optimization can periodically collect performance statistics and network configuration. The iterative process can use the collected information to adjust various operating parameters in the system to improve coverage and call quality.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for call quality and coverage improvement within a mobile wireless radio network. Through the use of the embodiments presented herein, call quality and coverage may be improved within a wireless radio network by iteratively adjusting cell size and shape while also adjusting various other system parameters.

While the subject matter described herein is presented in the general context of program modules that execute in conjunction with the execution of an operating system and application programs on a computer system or embedded processor system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for improving call quality and coverage within a mobile wireless radio network.

Figure 1:
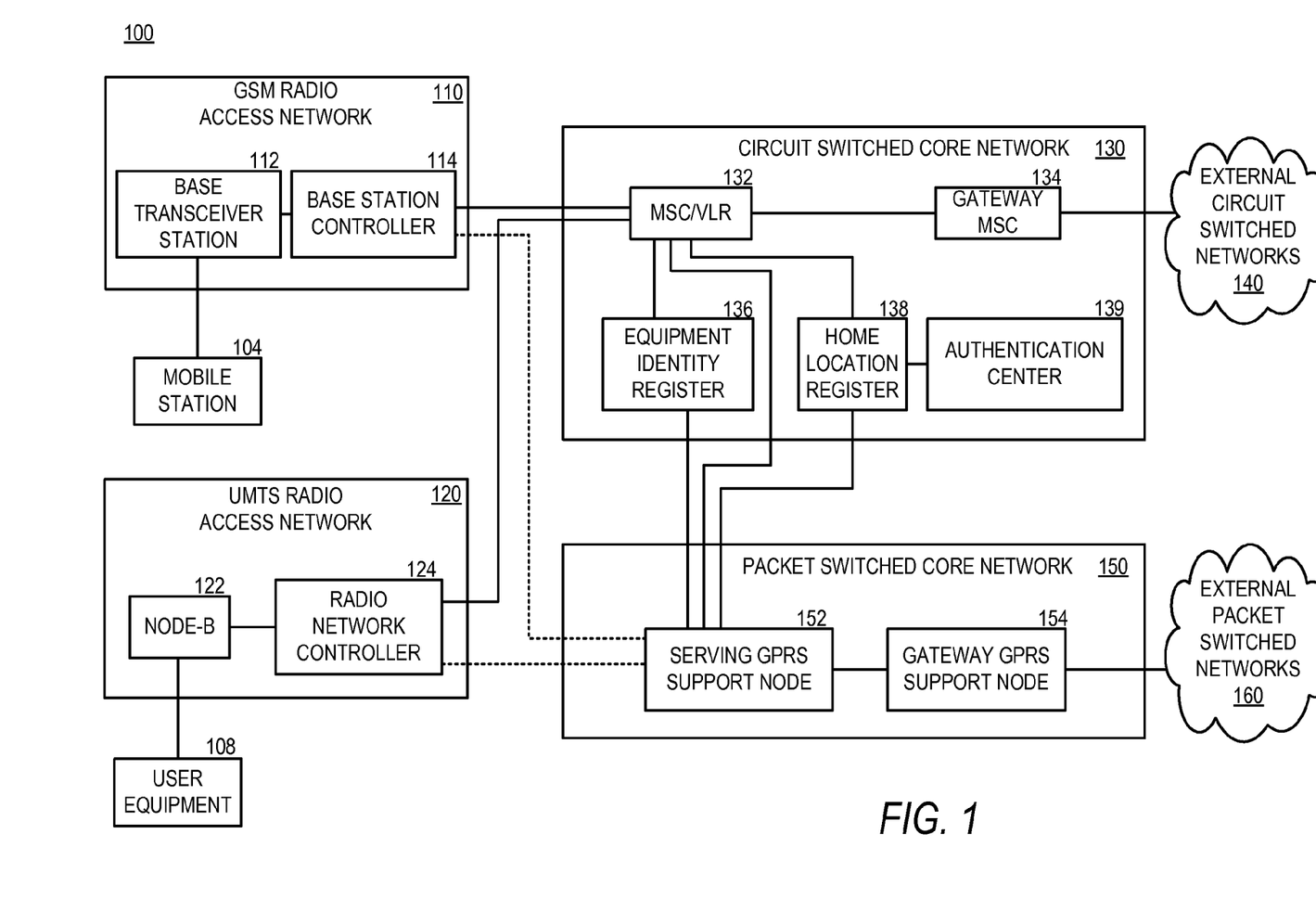
FIG. 1 is a network architecture diagram illustrating aspects of a GSM and UMTS mobile wireless communication system according to embodiments presented herein.

Turning now to FIG. 1, details will be provided regarding an illustrative operating environment for the implementations presented herein, as well as aspects of several software components that provide the functionality described herein for improving call quality and coverage within mobile wireless radio networks. In particular, FIG. 1 is a network architecture diagram illustrating aspects of a Global System for Mobile (GSM) and Universal Mobile Telecommunications System (UMTS) mobile wireless communication system 100 according to embodiments presented herein. Configuration parameters within a mobile wireless radio network may be transformed from an initial configuration to a second configuration, or an improved configuration, by the operations and technologies discussed herein. Such a transformation may improve call quality and coverage within the mobile wireless radio network.

A GSM radio access network (GSM RAN) 110 can service multiple mobile subscribers such as a mobile station 104. A base station subsystem (BSS) can handle traffic and signaling between a mobile station 104 and the telephone switching network. The BSS can include a base transceiver station (BTS) 112 providing multiple transceivers, antennas, and other radio equipment to support transmitting and receiving radio signals with the mobile stations 104 being serviced. A "Um" link, or air interface, can be established between each mobile station 104 and the BTS 112.

A base station controller (BSC) 114 associated with the BTS 112 can provide control intelligence for the GSM RAN 110. A BSC 114 can have multiple BTS systems 112 under its control. The BSC 114 can allocate radio channels, receive measurements from mobile stations 104, and control handovers from one BTS 112 to another. The interface between a BTS 112 and a BSC 114 can be an "Abis" link. The BSC 114 can act as a concentrator where many Abis links can be aggregated and relayed to the network core.

A UMTS radio access network (UMTS RAN) 120 can provide another example of a base station subsystem (BSS). UMTS is an example of a third generation (3G) mobile communications technology. The UMTS RAN 120 can service mobile units, such as user equipment 108. The air interface in a UMTS RAN 120 can be referred to as a "Uu" link. A UMTS base station subsystem can include a Node-B 122 and a radio network controller (RNC) 124. A Node-B 122 and a RNC 124 can be interconnected by an "Iub" link.

An RNC 124 or BSC 114 can generally support as many as hundreds of Node-B 122 or BTS 112 respectively. A Node-B 122 or BTS 112 can generally support three or six cells, although other numbers may be used. Multiple GSM RAN 110 base stations or UTMS RAN 120 base stations can connect to either or both of a circuit switched core network 130 or a packet switched core network 150.

A BSC 114 within a GSM RAN 110 can connect to a MSC/VLR 132 within a circuit switched core network 130 over an "A" Link. An "A" link can carry traffic channels and SS7 control signaling. Similarly, a BSC 114 within a GSM RAN 110 can connect to a serving GPRS support node (SGSN) 152 within a packet switched core network 150 over a "Gb" link.

An RNC 124 within a UMTS RAN 120 can connect to a MSC/VLR 132 within a circuit switched core network 130 over an "Iu-CS" link. Similarly, an RNC 124 within a UMTS RAN 120 can connect to a serving GPRS support node (SGSN) 152 within a packet switched core network 150 over an "Iu-PS" link.

Within the circuit switched core network 130, the MSC/VLR 132 can interface to an equipment identity register 136, a home location register 138, and an authentication center 139. The MSC/VLR 132 can also interface to a gateway mobile switching center 134 to access external circuit switched networks 140. External circuit switched networks 140 may include Integrated Services Digital Network (ISDN) systems, Public Switched Telephone Network (PSTN) systems, and various other circuit switched technologies.

Within the packet switched core network 150, the SGSN 152 can interface with a gateway GPRS support node (GGSN) 154 to access external packet switched networks 160. External packet switched networks 160 can include the Internet, intranets, extranets, and various other packet data network technologies.

Figure 2:
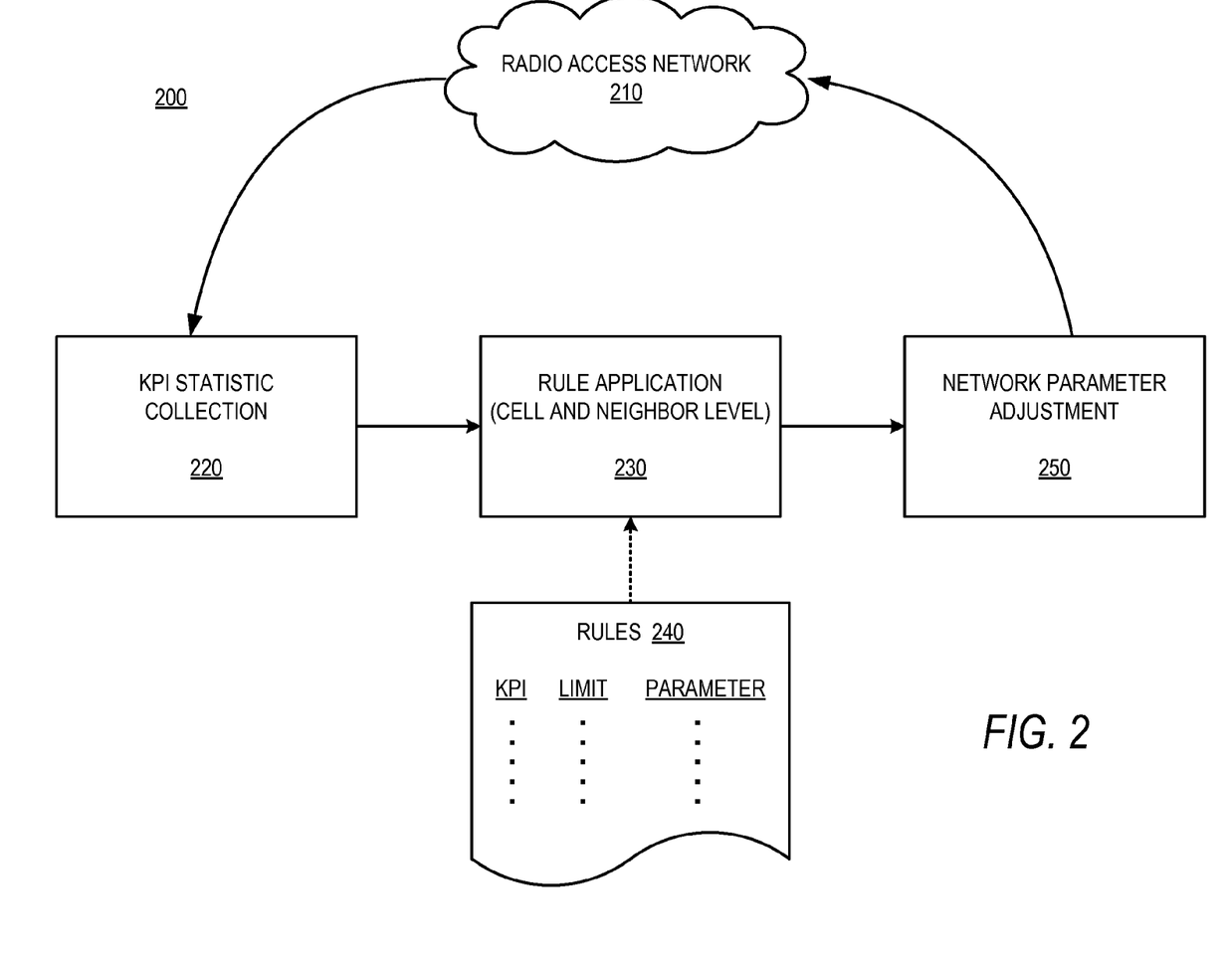
FIG. 2 is a block diagram illustrating the application of rules to adjust network parameters for improved coverage and call quality according to embodiments presented herein.

Referring now to FIG. 2, a block diagram illustrates applying rules to adjust network parameters for improved coverage and call quality according to embodiments presented herein. Network statistics can be collected from a radio access network 210 (RAN). The network statistics may be retrieved from the operation and support system (OSS) of the RAN 210. The network statistics may also be retrieved from any intermediate element storing the requested data, performance statistics, or configuration parameters. Key performance indicators (KPIs) of the RAN 210 may be derived from RAN 210 data retrieved for a pre-defined measurement period. KPI statistic collection 220 can aggregate the requested data and statistics together for detecting coverage and call quality issues. The period for collecting KPI statistics may be set as a predetermined parameter, or determined in real time. A longer period for collection may provide improved stability and reliability of the KPI statistics. However, long collection periods may also reduce the responsiveness of the parameter adjustments. Adjustment of the collection period used in KPI statistic collection 220 can establish a balance between these effects.

A set of rules 240 may be provided. Each of the rules 240 may specify one or more KPIs to test, limits specifying high or low thresholds for the KPIs, and one or more parameters to adjust in response to the specified KPI crossing over the specified limit. Rule application 230 can put the rules 240 into practice at the cell and neighbor level to adjust system parameters. The rules 240 can be considered implementations of system policies. The policies may be classified into three categories. These categories may be labeled call quality policies, coverage policies, and capacity policies. Each policy may include one or more rules 240.

KPI statistic collection 220, at each cell, can provide cell KPIs to be correlated against the rules 240 by rule application 230. Any discrete correlation technique may be used to determine the rules 240 that are in play for each cell. The outputs can be normalized. The normalized outputs related to a given parameter may be summed or averaged together. If a cell has a KPI value equal to, or greater than, a maximum KPI threshold for a given rule 240; or if a cell has a KPI value equal to, or less than, a minimum KPI threshold for a given rule 240, an output may be generated against the parameter, or parameters, associated with the rule. The same process may be repeated for a set of provided rules 240. The generated outputs may then be summed together. Network parameter adjustment 250 may then apply parameter updates within the RAN 210 according to the outputs, aggregated outputs, or sums of outputs. A parameter update may be scaled to a maximum step size established per adjustment iteration.

One example KPI to be collected during KPI statistic collection 220 and considered among the rules 240 during rule application 230 may be a KPI related to service coverage. The coverage level KPI may be measured using a statistic for counting a number of events where radio conditions drop below a certain quality threshold. For example, some radio resource management (RRM) procedures may be triggered by drops in quality thresholds for certain radio conditions. These conditions may be measured on the pilot channel. For example, in UMTS, inter-radio access technology (IRAT) handovers may be triggered by detected levels in received signal code power (RSCP) or chip energy per power density (Ec/No) associated with a common pilot channel (CPICH).

Another example KPI to be collected during KPI statistic collection 220 and considered among the rules 240 during rule application 230 may be for excessive propagation delay. The propagation delay KPI may be measured using propagation delay counters while accessing a cell via a random access channel (RACH). This technique can provide an indicator of cell service radii.

Another example KPI to be collected during KPI statistic collection 220 and considered among the rules 240 during rule application 230 may be for uplink quality. The uplink quality KPI may be measured by a count of events triggered by uplink quality falling below a certain threshold. For example, IRAT handovers due to high UMTS equipment transmit power levels may be counted. The uplink quality KPI may also be measured using uplink block error rate (BLER). The uplink quality KPI may also be measured using a received block failure rate.

Another example KPI to be collected during KPI statistic collection 220 and considered among the rules 240 during rule application 230 may be for soft handover factor. The soft handover KPI may be measured by an average number of cells participating in soft handover. This measurement can indicate coverage that may overlap between neighbors.

Another example KPI to be collected during KPI statistic collection 220 and considered among the rules 240 during rule application 230 may be for dropped call ratio. The dropped call KPI may be a count of the calls ended due to a radio condition.

Another example KPI to be collected during KPI statistic collection 220 and considered among the rules 240 during rule application 230 may be for frequent power clipping. The power clipping KPI may be measured by a count of events triggered by maximum allowed downlink power.

Parameters adjusted by network parameter adjustment 250 can be defined at the cell level. That is, the parameters are applied independently cell by cell. Most of the cell parameters may also affect neighbor performance. Thus, some rules 240 may use neighbor KPIs for correlation calculations in addition to cell level KPIs. Neighbor KPIs may be defined as an average of a given KPI at each neighbor within a neighbor list for a reference cell. The average may be weighted by the number of outgoing handovers per neighbor.

One or more rules 240 may define a coverage policy for effectuating cell coverage adjustment. These rules may affect pilot channel power and, when available, electrical antenna tilting. If KPI statistics suggest a coverage increase, the change may be provided by increasing the pilot power, reducing antenna tilt or both. Conversely, if a coverage reduction is suggested, pilot power reduction, antenna tilt increase, or both may be applied. Coverage reduction may be suggested in response to cell overshoot, an excessive number of cells covering an area, or boomer cells. Coverage increase may be suggested in response to poor coverage conditions. Coverage issues may be coded into rules indicated by one or more KPIs exceeding their acceptable limits.

One or more rules 240 may define a call quality policy for effectuating call quality adjustment. These adjustments may involve handover configuration for intra-frequency (IAF) handovers, inter-frequency (IEF) handovers, or IRAT handovers. The adjustments may also involve the maximum downlink power per user. Handover parameters may be adjusted to make handovers occur more or less readily. In cases of excessive dropped call rates, adjustments may provide for IAF, IEF and IRAT handovers to be made more readily. In instances of excessive power clipping, a maximum downlink power per user may be increased. In an absence of excessive power clipping, the maximum downlink power per user may be decreased. The decrease may be particularly effective when the soft handover factor is high. This may support reduced interference to neighbor cells.

One or more rules 240 may define a capacity policy for preventing congestion problems due to resource shortage. A capacity policy may be implemented as one or more limiters on adjustments made with respect to the coverage and call quality policies. These limiters can avoid coverage and call quality improvements made at the expense of capacity.

One example limiter for implementing capacity policy may be a coverage increase limit. The coverage increase limit may prevent increasing the coverage of a cell when the increase would negatively impact capacity.

Another example limiter for implementing capacity policy may be a coverage decrease limit. The coverage decrease limit may prevent decreasing the coverage of a cell when the decrease would negatively impact capacity in a neighboring cell.

Another example limiter for implementing capacity policy may be a maximum downlink power per user. The maximum downlink power per user limit may prevent a change where the relevant cell has reached capacity with respect to downlink transmit power.

Another example limiter for implementing capacity policy may be a handover limit. When neighboring cells are at, or approaching capacity, adjustments may be performed to make IAF, IEF, and IRAT handovers occur less readily.

Handovers discussed herein may occur at three different neighbor levels: intra-frequency (IAF) neighbors using the same carrier, inter-frequency (IEF) neighbors using different carriers, and inter-radio access technology (IRAT) neighbors in different radio access networks (RAN). Additional details related to interlayer handovers are disclosed in co-pending U.S. patent application Ser. No. 11/847,172, filed on Aug. 29, 2007, entitled "Optimization of Interlayer Handovers in Multilayer Wireless Communication Networks," which is assigned to the assignee of the instant patent application and is expressly incorporated herein by reference in its entirety.

Figure 3:
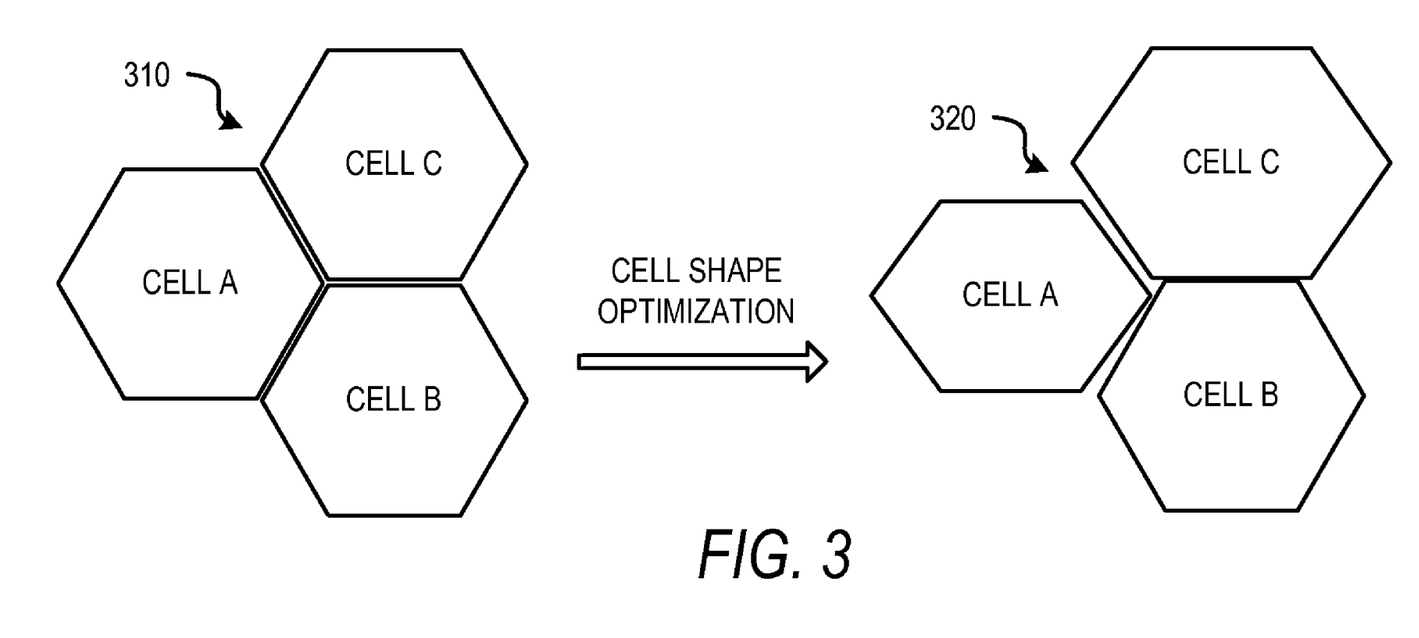
FIG. 3 is a mobile radio cell diagram illustrating cell reshaping for improving call quality and coverage within a wireless communications network according to embodiments presented herein.

Referring now to FIG. 3, a mobile radio cell diagram illustrates cell reshaping for improving call quality and coverage within a wireless communications network according to embodiments presented herein. Cells may be resized, reshaped, or both to support improved coverage and call quality. These improvements may reduce or delay the addition of base station sites within the network. Call quality may be improved on cells with excess capacity by providing additional resources per user where possible.

An initial cell structure 310 can be reshaped to a modified cell structure 320. In the illustrated example, a reduction in the size and shape of CELL A and an increase in the size and shape of neighboring CELL C can provide a reallocation of resources from CELL A to neighboring CELL C.

Cell coverage adjustment can be accomplished using pilot power adjustment. Pilot power can be adjusted between neighboring cells so as to displace the center point between the two cells. Shifting the center between the two cells closer to the lower performing cell can effectively reduce the size of the overloaded cell and thus reallocate resources between neighboring cells.

Cell coverage adjustment can also be accomplished using antenna tilt. A remote electrical antenna tilt (RET) mechanism can provide a downward tilt to an antenna in an overloaded cell. Applying a downward tilt can reduce the propagation horizon of the antenna and effectively reduce the size of the cell.

Coverage checks can be performed while adjusting cell coverage. When reducing pilot power or increasing antenna tilt, there can be a reduction in cell coverage area and thus a risk of coverage loss in the network system. Likewise, when increasing the pilot power or reducing the antennae tilt, coverage area can be increased thus risking over-shots or excessive interference to neighboring cells.

A coverage check against reduced coverage or coverage loss can use any statistic that counts events triggered by call drop conditions falling below a certain poor quality threshold. For example, excessive intersystem handovers may indicate coverage loss. In such conditions, cell coverage reduction can be avoided.

A coverage check against excess coverage or overshoot can use propagation delay counters. When propagation delay is higher than a specified threshold, a cell may be suffering from overshoot. Also high uplink block error rate (UL BLER) or high mobile device transmit power can indicate that a cell may be suffering from overshoot. When the cell suffers from overshoot or excessive overlapping, cell coverage increase may be limited by the coverage policy rules.

Figure 4:
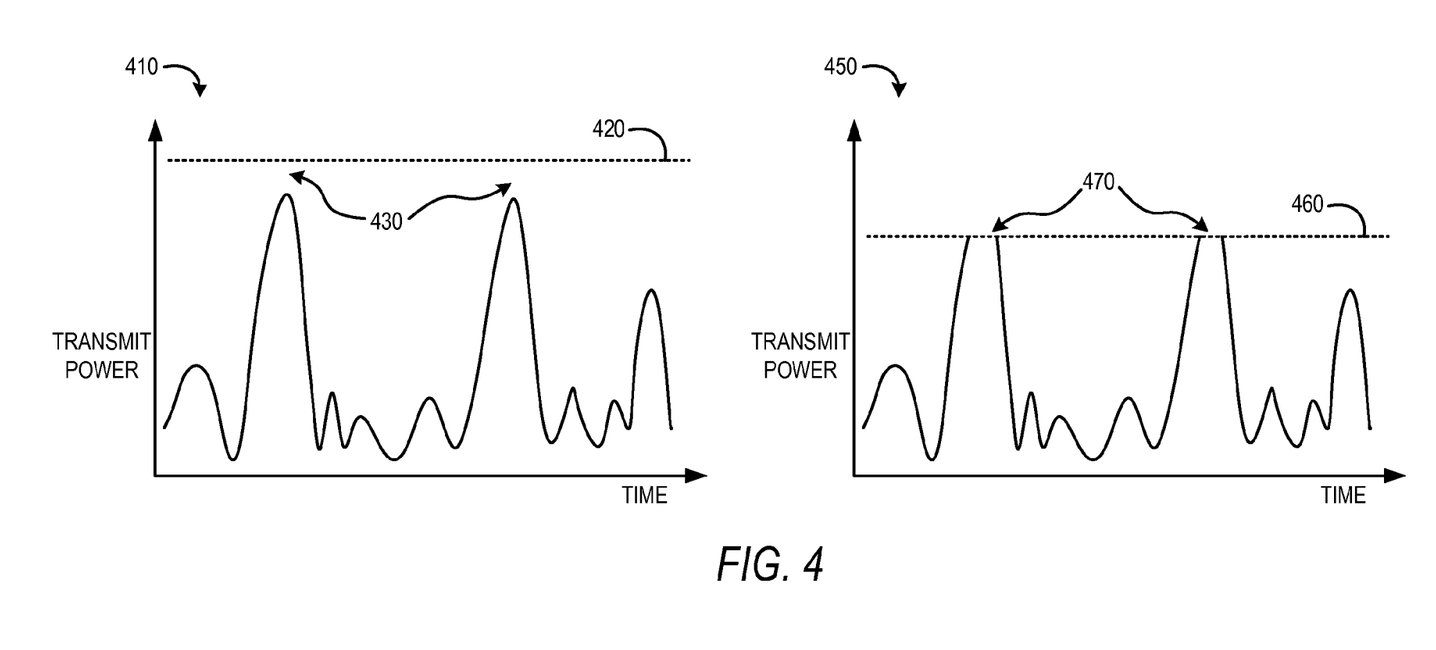
FIG. 4 is a pair of transmit power plots illustrating maximum power parameter adjustments according to embodiments presented herein.

Referring now to FIG. 4, transmit power plots illustrate maximum power parameter adjustments according to embodiments presented herein. Maximum transmit power per link is one example of a RAN 210 parameter that may be affected by network parameter adjustment 250 according to the application of rules 240 as discussed with respect to FIG. 2.

A relatively low maximum transmit power per link 460 is illustrated in transmit power plot 450. Such a low maximum transmit power per link 460 may represent clipping at power peaks 470. The power clipping may relate to reduced call quality. The application of rules 240, as discussed with respect to FIG. 2, as discussed with respect to FIG. 2, may suggest an upward adjustment in the system parameter for maximum transmit power per link for the particular cell.

A relatively high maximum transmit power per link 420 is illustrated in transmit power plot 410. An elevated maximum transmit power per link 420 may represent an excessive use of power budget within a particular cell. Excessive power per link 420 may be unnecessary to maintain acceptable call quality. Furthermore, such a power allocation 430 may result in a reduced power capacity and increased interference to neighbor cells. The application of capacity policy limiters may prevent upward adjustment in the system parameter for maximum transmit power per link as this may result in wasted power capacity, increased interference to neighbor cells, or both.

Iterative application of the rules 240 and policies can increase a low maximum transmit power per link 460 and reduce (or limit) a high maximum transmit power per link 420 until an optimized, or nearly optimized, parameter setting is reached for the maximum transmit power.

Figure 5:
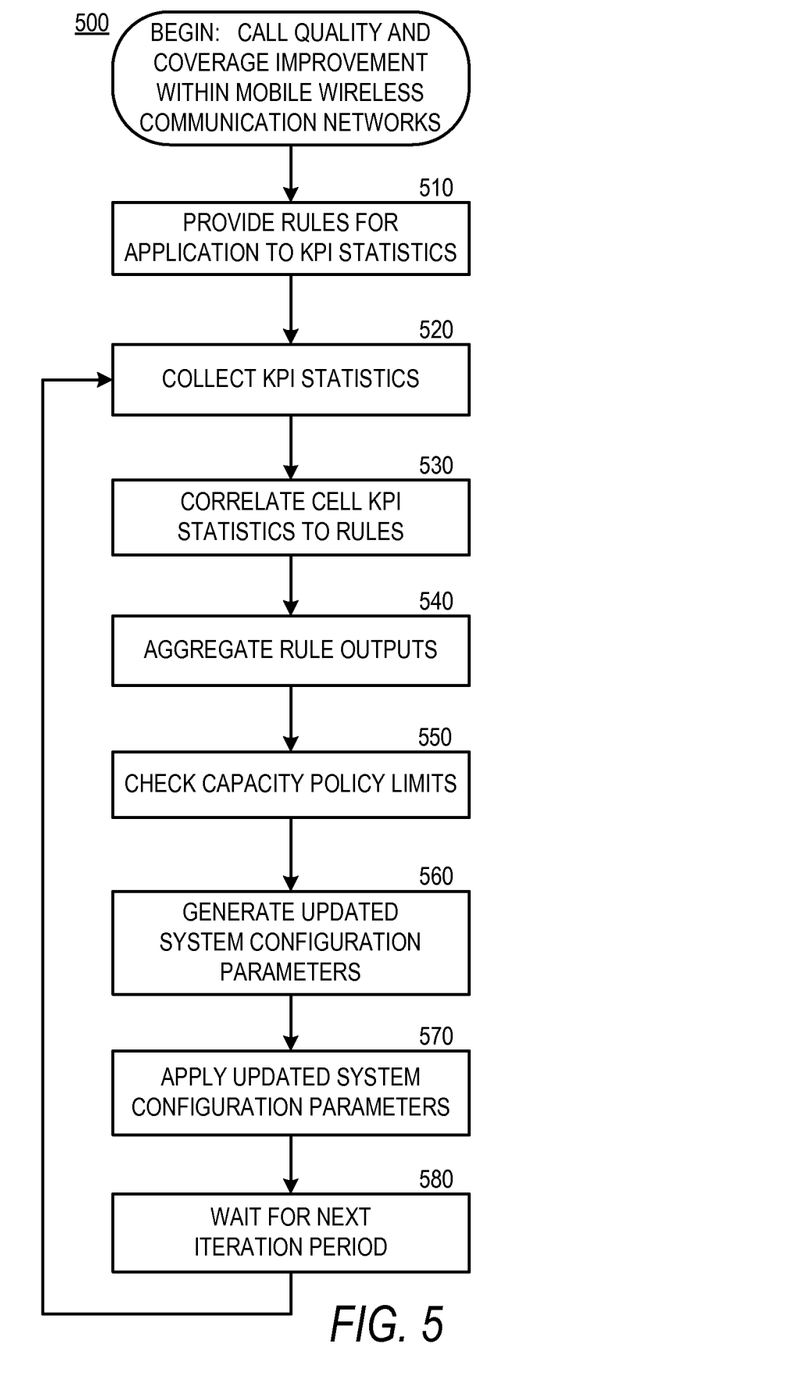
FIG. 5 is a logical flow diagram illustrating a process for call quality and coverage improvement in mobile wireless networks according to embodiments presented herein.

Turning now to FIG. 5, additional details will be provided regarding the embodiments presented herein for improving call quality and coverage within a mobile wireless radio network. In particular, FIG. 5 is a flow diagram showing a routine 500 that illustrates aspects of a process for call quality and coverage improvement in mobile wireless networks according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. These operations can transform various input parameters into various output parameters. It should also be appreciated that more or fewer operations may be performed than shown in the figures and described herein. These operations may also be performed in parallel, or in a different order than those described herein.

The routine 500 can begin with operation 510 where rules 240 are provided for application to KPI statistics and for suggesting parameters with the RAN 210 for adjustment. These rules may be determined by system design, power budgets, frequency assignments, equipment specifications, rules of thumb, performance goals, base station positions, interferers, and various other characteristics of the system and operation of the RAN 210.

At operation 520, KPI statistics can be collected by KPI statistic collection 220 as discussed with respect to FIG. 2. The KPI statistics may be retrieved, in whole or in part, from the operation and support system (OSS). The KPIs can indicate the need for system adjustments.

At operation 530, the KPI statistics collected in operation 520 may be correlated with the rules 240 provided in operation 510. The correlation may be established by matching the rule limits or by using any discrete correlation technique. An output for correlating a rule may correspond to the listed parameters for that rule 240. The rules 240 may be applied at the cell level and neighbor level. Three examples of different neighbor levels include: intra-frequency (IAF) neighbors using the same carrier, inter-frequency (IEF) neighbors using different carriers, and inter-radio access technology (IRAT) neighbors.

At operation 540, results from applying the various rules 240 in operation 530 may be aggregated together for each parameter result. When a cell has a KPI value equal to, or greater than, a maximum KPI threshold for a given rule 240; or if a cell has a KPI value equal to, or less than, a minimum KPI threshold for a given rule 240, an output may be generated against the parameter, or parameters, associated with the rule. When more than one KPI is used in the rule, the output may be an arithmetic combination of each KPI comparison outcome. The outputs may be normalized. The normalized outputs related to a given parameter may be summed, averaged, or otherwise aggregated together where multiple rules effect the same parameter. These outputs, or aggregations of outputs, may support determination of updates for the associated configuration parameter.

At operation 550, capacity policy rules may be checked. In addition to the coverage and call quality rules, the rules associated with capacity policy may provide limiters to prevent the adjustment of certain parameters to the point of reducing capacity. Some example capacity elements to check may include: downlink transmit power, code allocation; bandwidth between a NodeB and an RNC, uplink interference, channel elements, and load at the call processor.

At operation 560, updated system configuration parameters can be generated according to adjustments suggested by the rules correlated in operation 530 and aggregated in operation 540. System parameters can be adjusted on two different levels. Firstly, parameters can be adjusted at the cell level. Secondly, neighbor level parameters can be adjusted. These neighbor parameters can be considered per adjacency relationship.

Generally, the step applied in updating configuration parameters can be small with respect to the range allowed for each parameter. Such a small step refinement can support a gradual convergence within the configuration update algorithm. A gradual parameter convergence can minimize second order effects, overshoot, and thrashing within the control system.

At operation 570, the updated system configuration parameters as generated in operation 560 can be applied to the various configurable subsystems within the wireless radio network 210. Operation 580 can comprise a delay or wait cycle for the beginning of the next iteration period. The iteration period can determine the timing of the iterative process that collects system parameters and updates configuration parameters based on a periodic cycle. The period can be determined by a counter, timer, clock, real-time clock, interrupt, or other source of periodic scheduling or timing.

The performance parameters and KPI data can be collected for a predefined measurement period. Generally, a longer collection period can provide improved stability and reliability of the statistics. However, the increased collection period can provide a control system that is less reactive to changes. After operation 580, the routine 500 can loop back to operation 520 to collect the next set of performance parameters and KPI statistics.

Figure 6:
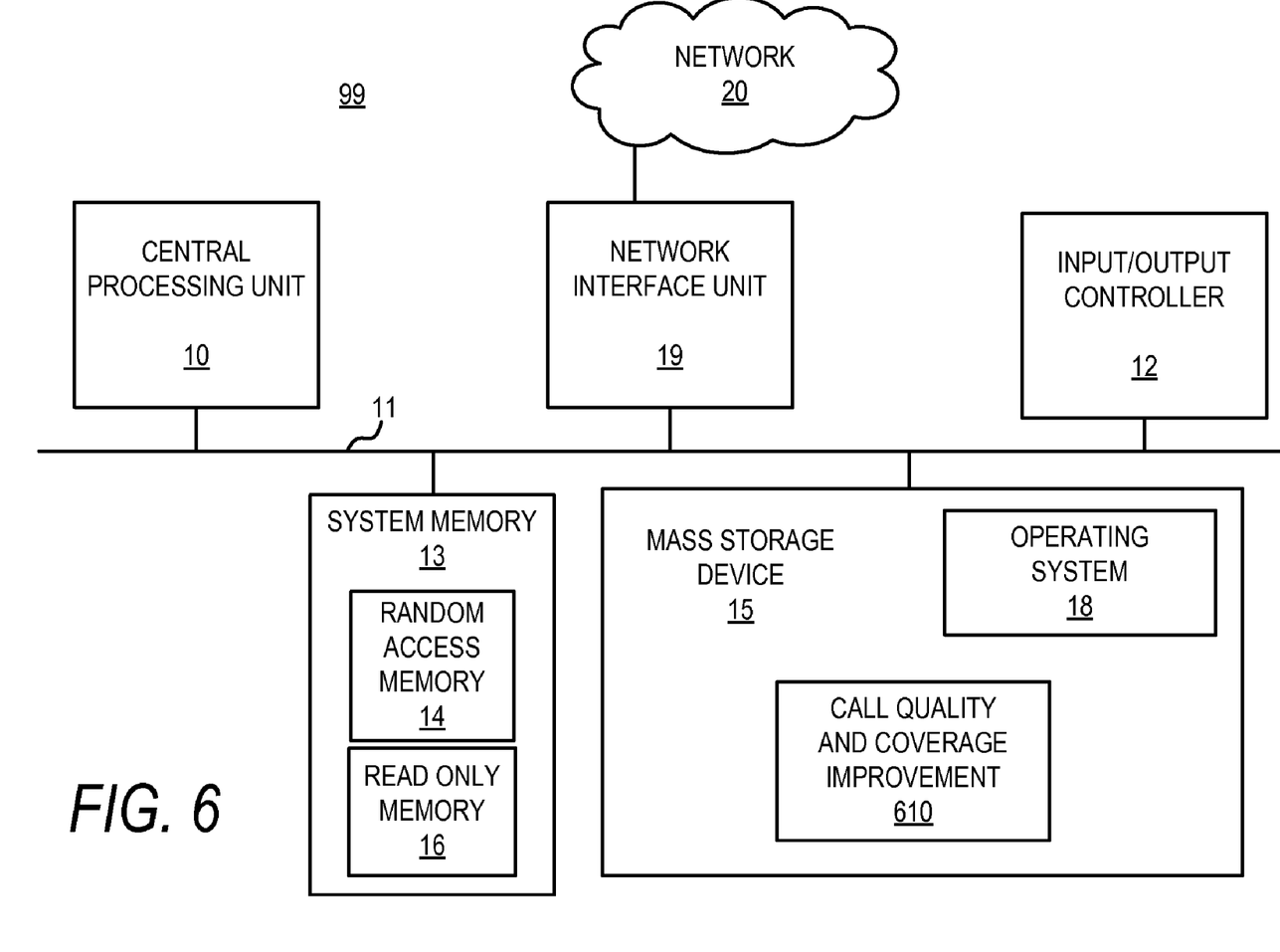
FIG. 6 is a computer architecture diagram illustrating computing system hardware capable of call quality and coverage improvement within a mobile wireless radio network according to embodiments presented herein.

Turning now to FIG. 6, an illustrative computer architecture 99 can execute software components described herein for improving coverage and call quality within a mobile wireless radio network. The computer architecture shown in FIG. 6 illustrates an embedded control computer, a conventional desktop, a laptop, or a server computer and may be utilized to execute aspects of the software components presented herein. It should be appreciated however, that the described software components can also be executed on other example computing environments, such as mobile devices, television, set-top boxes, kiosks, vehicular information systems, mobile telephones, embedded systems, or otherwise.

The computer architecture illustrated in FIG. 6 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 99, such as during startup, can be stored in the ROM 16. The computer 99 may further include a mass storage device 15 for storing an operating system 18, software, data, and various program modules, such as those associated with the call quality and coverage improvement system 610.

The mass storage device 15 can be connected to the CPU 10 through a mass storage controller (not illustrated) connected to the bus 11. The mass storage device 15 and its associated computer-readable media can provide non-volatile storage for the computer 99. Although the description of computer-readable media contained herein refers to a mass storage device, such as a hard disk or CD-ROM drive, it should be appreciated by those skilled in the art that computer-readable media can be any available computer storage media that can be accessed by the computer 99.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 99.

According to various embodiments, the computer 99 may operate in a networked environment using logical connections to remote computers through a network such as the network 20. The computer 99 may connect to the network 20 through a network interface unit 19 connected to the bus 11. It should be appreciated that the network interface unit 19 may also be utilized to connect to other types of networks and remote computer systems. The computer 99 may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

As mentioned briefly above, a number of program modules and data files may be stored in the mass storage device 15 and RAM 14 of the computer 99, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store modules associated with the call quality and coverage improvement system 610 for execution by the CPU 10. The call quality and coverage improvement system 610 can include software components for implementing portions of the technologies discussed in detail with respect to FIGS. 1-5. The mass storage device 15, the ROM 16, and the RAM 14 may also store other types of program modules. Based on the foregoing, it should be appreciated that technologies for improving call quality and coverage within a mobile wireless radio network are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for improving coverage within a mobile wireless communications network, the method comprising:
   providing one or more rules related to coverage in the wireless communications network;
   collecting key performance indicators from the wireless communications network, the key performance indicators comprising data indicating a count of events triggered by at least one of an uplink quality falling below a threshold or a maximum allowed downlink power state;
   correlating the key performance indicators with the one or more rules relating to adjusting at least one of a pilot power or an antenna tilt;
   generating adjustments to one or more parameters within the wireless communications network in response to the key performance indicators correlating to the one or more rules; and
   applying the generated adjustments to the wireless communications network.

2. The method of claim 1, wherein the key performance indicators further comprise:
   a soft handover key performance indicator comprising data indicating an average number of cells participating in soft handover; and
   a dropped call key performance indicator comprising data indicating a count of calls ended.

3. The method of claim 1, wherein collecting the key performance indicators comprises periodically collecting the key performance indicators from an operation and support system associated with the wireless communications network.

4. The method of claim 1, further comprising aggregating results obtained from correlating the key performance indicators with the one or more rules.

5. The method of claim 1, further comprising applying capacity policy limits to the generated adjustments prior to applying the generated adjustments to the wireless communications network.

6. The method of claim 1, wherein applying the generated adjustment to the wireless communications network comprises adjusting coverage of a cell by increasing a pilot power and reducing an antenna tilt, in response to determining that the key performance indicators suggest a coverage increase.

7. The method of claim 1, wherein applying the generated adjustment to the wireless communications network comprises adjusting coverage of a cell by decreasing a pilot power and increasing an antenna tilt, in response to determining that the key performance indicators suggest a coverage reduction.

8. A method for improving call quality within a mobile wireless communications network, the method comprising:
   providing one or more rules related to call quality in the wireless communications network;
   collecting key performance indicators from the wireless communications network, the key performance indicators comprising data indicating a count of events triggered by at least one of an uplink quality falling below a threshold or a maximum allowed downlink power state;
   correlating the key performance indicators with the one or more rules relating to at least one of adjusting a handover configuration or a maximum downlink power per user;
   generating adjustments to one or more parameters within the wireless communications network in response to the key performance indicators correlating to the one or more rules; and
   applying the generated adjustments to the wireless communications network.

9. The method of claim 8, wherein the key performance indicators comprise:
   a soft handover key performance indicator comprising data indicating an average number of cells participating in soft handover; and
   a dropped call key performance indicator comprising data indicating a count of calls ended.

10. The method of claim 8, wherein collecting the key performance indicators comprises periodically collecting the key performance indicators from an operation and support system associated with the wireless communications network.

11. The method of claim 8, further comprising aggregating results obtained from correlating the key performance indicators with the one or more rules.

12. The method of claim 8, further comprising applying capacity policy limits to the generated adjustments prior to applying the generated adjustments to the wireless communications network.

13. A non-transitory computer storage medium having computer-executable instructions stored thereon which, when executed by a computer system, cause the computer system to:
   provide one or more rules relating performance indicators to parameters within a wireless communications network;
   collect values for the performance indicators from the wireless communications network, the performance indicators comprising data indicating a count of events triggered by at least one of an uplink quality falling below a threshold or a maximum allowed downlink power state, and being associated with at least one cell within the wireless communications network;
   correlate the performance indicators with the one or more rules;

generate adjustments the parameters in response to the performance indicators correlating to the one or more rules; and apply the generated adjustments to the wireless communications network by adjusting a pilot power or an antenna tilt associated with the at least one cell.

14. The computer storage medium of claim 13, where one of the one or more rules is associated with service coverage.

15. The computer storage medium of claim 13, where one of the one or more rules is associated with call quality.

16. The computer storage medium of claim 13, wherein collecting the performance indicators comprises periodically collecting the performance indicators.

17. The computer storage medium of claim 13, wherein the computer system is further caused to aggregate results obtained from correlating the performance indicators with the one or more rules.

18. The computer storage medium of claim 13, wherein the computer system is further caused to apply capacity policy limits to the generated adjustments prior to applying the generated adjustments to the wireless communications network.

19. The computer storage medium of claim 13, wherein applying the generated adjustment to the wireless communications network comprises adjusting coverage of a cell by increasing a pilot power and reducing an antenna tilt, in response to determining that the key performance indicators suggest a coverage increase.

20. The computer storage medium of claim 13, wherein applying the generated adjustment to the wireless communications network comprises adjusting coverage of a cell by decreasing a pilot power and increasing an antenna tilt, in response to determining that the key performance indicators suggest a coverage reduction.

* * * * *

UNITED STATES PATENT AND TRADEMARK OFFICE
CERTIFICATE OF CORRECTION

PATENT NO. : 8,301,149 B2  
APPLICATION NO. : 12/369936  
DATED : October 30, 2012  
INVENTOR(S) : del Rio Romero et al.

Page 1 of 1

It is certified that error appears in the above-identified patent and that said Letters Patent is hereby corrected as shown below:

In Column 8, Line 16, delete "Fig. 2, as discussed with respect to FIG. 2," and insert -- Fig. 2, --, therefor.

In Column 11, Lines 15-25, delete "Based on the ............ the claims." and insert the same on Line 16, below "modules." as a new paragraph.

Signed and Sealed this  
Second Day of April, 2013

Teresa Stanek Rea  
*Acting Director of the United States Patent and Trademark Office*